Patented July 21, 1953

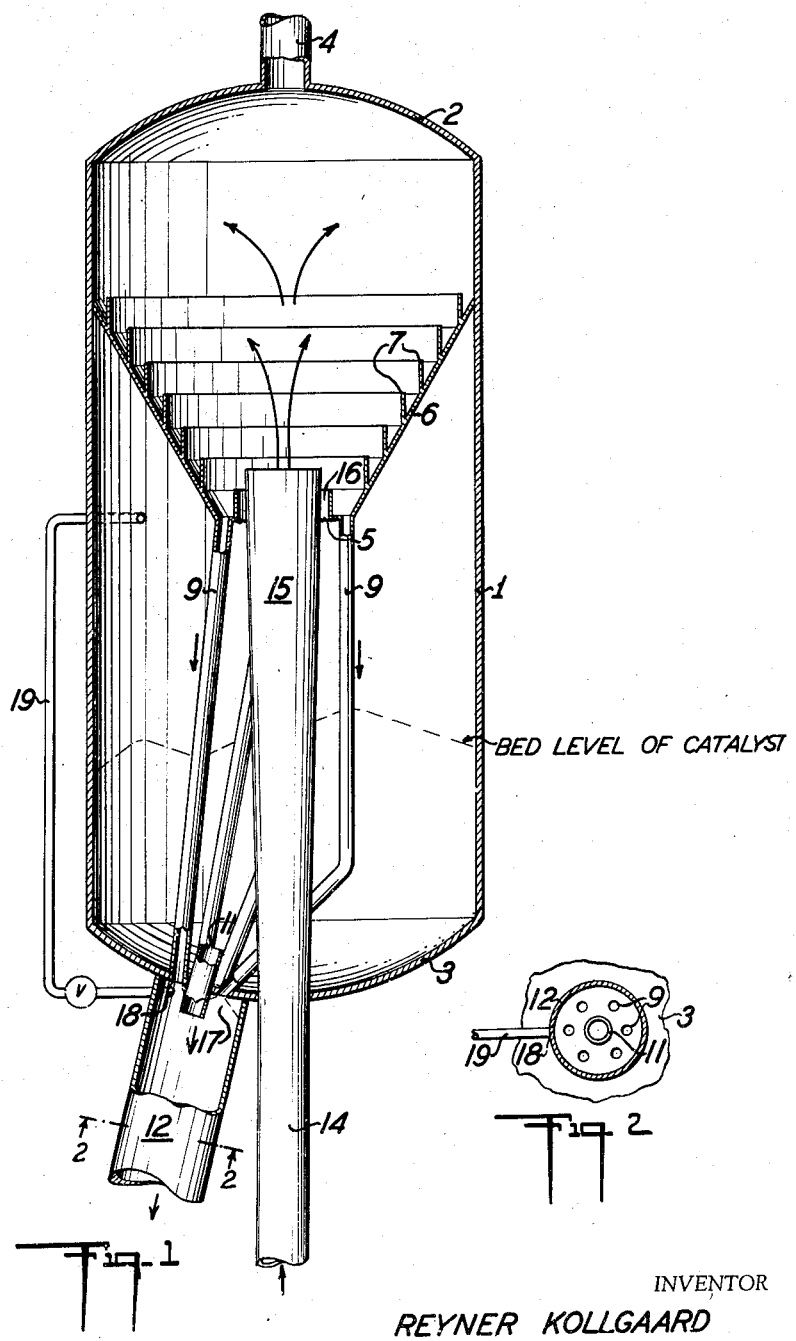

2,646,316

UNITED STATES PATENT OFFICE 2,646,316

SOLIDS LIFT DISENGAGER

Reyner Kollgaard, Media, Pa., assignor to Houdry Process Corporation, Wilmington, Del., a corporation of Delaware Application July 19, 1951, Serial No. 237,573

8 Claims. (Cl. 302—59)

This invention relates to improvements in the prevention of attrition of granular or particle-form catalysts which are employed in hydrocarbon cracking processes; and, more particularly, to a method and apparatus for reducing the effects of impact in the attrition of catalyst upon its discharge from the upper end of the lift pipe of a gas elevator.

In that type of system for the cracking of hydrocarbons wherein the hydrocarbons are contacted with a catalyst in the form of particles or pellets, there has been developed what is known as a moving catalyst process. This moving catalyst process involves initially contacting the hydrocarbons with a catalyst in the form of particles or pellets, followed by conveying such catalyst away from the reaction zone and into a regeneration zone wherein the coke which is formed on the particles or pellets during the reaction step is removed. After this operation, the regenerated catalyst is conveyed to the reaction zone for further contact with the hydrocarbons to be cracked. Catalysts of various particle sizes are employed in such hydrocarbon cracking processes.

The solid materials with which the present invention is concerned have an average particle size of 14 mesh or larger, and include coarse granules, as well as the typical commercial beads and whole pellets of 2 to 5 mm. diameter.

Older methods for moving the granular or particle-form catalyst during circulation through such systems included mechanical means, such as bucket elevators. More recently it has been proposed to move or elevate the catalyst from a lower region of the system to an upper region thereof by means of a gas elevator. Such gas elevators comprise a hopper, and elongate vertically disposed lift pipe, and a separator or disengaging chamber at the top of the latter. In operation, the catalyst particles or pellets are permitted to flow, generally by gravity, into the hopper, forming a confined bed in the latter. The lift pipe of the gas elevator extends downwardly into the hopper and beneath the surface of the confined bed. A suitable gas stream is introduced into the bed within the hopper and flows upwardly therefrom through the lift pipe, whereby the catalyst particles are impelled by, and carried along with, the gas stream. After traveling upwardly through the lift pipe, the gas and entrained catalyst particles are discharged into the separator or disengaging chamber, the particles falling by gravity to the bottom of the chamber and the gas being withdrawn from the top or other suitable region of the chamber.

During the commercial operation of hydrocarbon cracking processes employing a gas elevator, attrition of the catalyst particles or pellets may develop, resulting in the formation of fines and loss of catalyst through the necessary removal from the system of these fines. One cause of attrition of the catalyst has been found to be a result of the particles issuing from the gas elevator at a relatively high velocity and impinging upon the walls and particularly the top of the separator or disengaging chamber. Another cause of catalyst attrition of serious consequence is the contact of the particles at the completion of their free fall subsequent to their separation from the elevating gas within the disengaging chamber.

This contact is of serious consequence because all of the particles disengaged from the elevating gas within the disengaging chamber fall by gravity to a lower level for subsequent removal from the disengaging chamber and such particles are therefore all in greater or less degree subject to relatively abrupt termination of movement upon completion of their free fall. The kinetic energy of such particles at their peak velocity, i. e., termination of free fall, may thus be sufficiently great to result in appreciable attrition and the breaking down eventually to fine powder. Also, it has been found that catalyst particles having similar kinetic energy are appreciably more subject to attrition when their fall is terminated by a relatively rigid non-yielding surface such as a steel plate or the like than when their fall is terminated on a surface of catalyst even when such surface is of a relatively thin layer of catalyst.

In view of the fact that processes of the aforementioned type continually recycle the catalyst in such manner that it passes through the gas elevator system many times, it will be readily appreciated that, if even a small percentage of the particles strike the surface of the disengaging chamber at high velocities coupled with the effects of all of the particles falling through long distance, rates of attrition may result that are uneconomically high because of the necessity for replacing the fines thus produced with new catalyst of proper size.

The present invention contemplates the elimination, or material reduction, of the following defects in gas elevators of the class herein under consideration:

Excessive falling distances in the separator or disengaging chamber.

Impingement of catalyst on the side walls of the disengaging chamber.

Impingement of rising catalyst against the bottom of the dome of the disengaging chamber.

It is among the objects of the present invention to eliminate, or at least greatly reduce, the attrition of granular or particle-form catalyst employed in hydrocarbon cracking processes by decreasing and cushioning its fall after it has been discharged from the upper end of the lift pipe of a gas elevator.

Another object is the attainment of the foregoing by permitting catalyst of the class described to discharge from the upper end of the lift pipe of the gas elevator at reduced velocity and to fall downwardly by gravity onto a cushioning bed of catalyst without contacting any overhead confining housing or baffle.

Still another object is the attainment of the foregoing by the use of apparatus which is not only efficient in operation, but which is also inexpensive to manufacture, install, operate and maintain.

The foregoing and other objects will become more apparent after referring to the following specification and accompanying drawing wherein:

Figure 1 is a fragmentary elevation, partly in section, of a separator or disengaging chamber of the type referred to earlier herein and which employs apparatus constructed in accordance with the teachings of the present invention, and Figure 2 is a partial plan view taken on line 2—2 of Figure 1.

Referring more particularly to the drawing, the numeral 1 designates a substantially vertically disposed, elongate, substantially cylindrical housing for the apparatus of the present invention.

As shown, the substantially cylindrical housing 1 is provided with a dome-shaped top or cover 2 and interiorly concave bottom portion 3, the top or cover 2 being provided with a gas outlet 4.

According to the teachings of the present invention, there is suitable supported within an intermediate region of the housing 1 an inverted frusto-conical partition plate 6 having a relatively large central opening 5, the nature and purpose of which is described below. A series of foreshortened vertically extending baffle plates 7 are mounted in spaced apart relation upon the upper surface of the inverted frusto-conical partition plate 6 and form a series of dams which retain a portion of the granular particles or pellets for a purpose and in a manner which will be described hereinafter.

The upper surface of the lower portion of the inverted frusto-conical partition plate 6 communicates with a plurality of down pipes 9 (shown here as six in number) which extend downwardly and project through the interiorly concave bottom portion 3 of the housing 1 and discharge into transfer pipe 12. In addition, there is provided in the bottom of the housing 1 and positioned substantially centrally of pipe 12 a short transfer tube 11. Since in many installations seal gas is passed upwardly through pipe 12, means are provided for venting the seal gas without necessitating flow thereof entirely through transfer tube 11. Such means are shown as comprising an opening 18 in transfer line 12, in communication with a vent tube 19, venting the gas to a high point in vessel 1.

Lift pipe 14 extends vertically upward, from a suitable source of lift gas and granular particles or pellets, concentrically through bottom portion 3, and continues within the housing 1 as outwardly tapering top portion 15 passing through opening 5 to a position which is slightly above the lower end of the inverted frusto-conical partition plate 6, but in spaced relationship with respect thereto.

According to the foregoing construction and arrangement, as gas and entrained granular particles or pellets are fed upwardly through the lift pipe 14 and from its upper end 15 of gradually increasing diameter, the granular particles or pellets will be projected in a flow pattern of the type indicated by the arrows. Preliminary deceleration of the catalyst particles is initiated in the outwardly tapering section 15 due to the gradually increasing cross-sectional area of this portion of the lift path. The mixture of gas and granular particles emerging from the discharge end of pipe 15 enter a region of substantially increased cross-sectional area wherein any lifting effect of the gas is substantially dissipated and the particles under the influence of gravity terminate their upward motion and fall thereafter in accordance with well-known gravitational velocity increase. If these falling particles are allowed to fall unobstructed to a distance greater than 10 to 15 feet, sufficient velocity is attained such that termination of the free fall by any relatively rigid or non-yielding surface will result in attrition of the particles. Within reasonable limits this attrition increases proportionately with an increase in velocity as may result from even greater falling distances. Therefore, as previously described, inverted frusto-conical partition plate 6 is positioned within vessel 1 suitably adjacent to and spaced apart from the upper extent of lift path 15 in such fashion that under ordinary operating conditions solids emerging from line 15 decelerating and thereafter falling by gravity are prevented from excessive free fall distances such as distances over 10 to 15 or more feet.

On partition plate 6 as previously mentioned there are a series of dams 7 in spaced relation with each other such that a suitable layer of catalyst is retained substantially completely across the entire upper surface of member 6 in such fashion that substantially no exposed metallic surface is available to the falling granular particles. The advantage in thus providing a layer of granular particles between the metal surface of plate 6 and the falling particles lies in that it has been found to be appreciably less productive of objectionable effects when the falling granular particles strike a surface of similar granular particles in preference to a rigid and non-yielding surface such as that of a metal plate.

The relatively large opening 5 through which the upper portion of pipe 15 extends while leaving an annular opening 16 of appreciable extent operates to permit a transfer of such particles collected on and moving down partition plate 6 which are not removed by solid column flow through down pipes 9, thus serving as a safety vent whereby amounts of solids in the lower region of member 6 are prevented from accumulating and possibly interfering with the emerging stream of solids and gas from lift path 15. Solids moving through annular opening 16 fall by gravity for collection on bottom plate 3 and ultimate removal therefrom in accordance with normal flow characteristics through pipe member 11. Due to the construction of bottom plate 3 and tubular member 11, a certain amount of granular particles are retained within the lower region of vessel 1 in such manner that catalyst falling through opening 16 strikes a layer of granular solids after a relatively short fall such as less than 10 feet so that attrition in this region is likewise substantially reduced or eliminated.

The major portion of the solids being removed from vessel 1 pass as before mentioned through pipes 9 into the annular space 17 between tubular member 11 and the internal wall of transfer line 12; only a minor flow is admitted through tubular member 11. The granular solids collected temporarily by inverted frusto-conical member 6 being thus transferred with solid column gravitating flow through down pipes 9 and only a minor portion passing through opening 16, the opportunity for attrition to the majority of the catalyst is further reduced by eliminating even the short fall from opening 16 to the surface of the granular particles collected in the bottom of vessel 1 and supported on closure member 3. The annular space 16 provides a flow area in excess of the capacity of tubular member 11. Above the bottom 3 of vessel 1 sufficient surge capacity is provided to take care of any fluctuations in catalyst volume.

As the projected granular particles or pellets fall downwardly, they strike upon, and cascade over, the series of dams provided by the baffle plates 7; thus avoiding excessive falling distance for the pellets or particles (and its accompanying attrition) through collection and transfer on the upper surface of the inverted frusto-conical partition plate 6. The catalyst passes thereafter from the upper surface of the inverted frusto-conical partition plate 6 in part through the down pipes 9, and in part through annular opening 16.

The majority of the particles or pellets will ordinarily have only sufficient velocity to travel a relatively short distance in the upper portion of the housing 1 and will, therefore, not be subject to attrition due to contact with the dome of the housing 1 or the upper portion of its side walls.

Whatever portion of the upwardly projected granular particles or pellets flows between the outwardly tapered end 15 of the lift pipe 14 and the annular opening 16 in the lower end of the inverted frusto-conical partition plate 6 is caught in the interiorly concave bottom 3 of the housing 1 and is fed therefrom through the short tube 11 and into the comparatively large seal leg 12. The relationship of the area of annulus 17 with respect to the area of seal leg 12 is controlling with respect to the amount of catalyst which flows through downpipe 9, which condition in turn reflects in the portion of catalyst which flows through annular opening 16. Thus, 75% or more of the catalyst may flow through downpipes 9 and the residual amount of catalyst flows through annular opening 16 to be transferred as previously described.

As the mixture of elevating gas and catalyst particles or pellets flow upwardly in the manner described immediately hereinbefore, the gas will continue upwardly beyond the zenith shown to flow out of the gas outlet conduit 4.

While certain specific embodiments of the present invention have been shown and described, it will be readily understood by those skilled in the art that the same is not to be limited exactly thereto, since various modifications may be made without departing from the scope of the invention as defined in the appended claims.

I claim as my invention:

1. Apparatus for lifting granular particles comprising a substantially vertically disposed substantially cylindrical housing, a lift pipe disposed concentrically of said substantially cylindrical housing and extending into the latter, said lift pipe being adapted to receive an upwardly moving gas stream and entrained granular particles, the upper end of said lift pipe being of un-reduced diameter, an inverted frusto-conical partition plate disposed within said substantially cylindrical housing, the lower end of said inverted frusto-conical partition plate being disposed below the upper end of said lift pipe, the upper surface of said inverted frusto-conical partition plate being provided with a series of dams to thereby provide a temporary repository for downwardly falling granular particles, and a series of down pipes communicating with the lower end of said inverted frusto-conical partition plate, the upper portion of said substantially cylindrical housing having a gas outlet positioned above said partition plate.

2. Apparatus for lifting granular particles comprising a substantially vertically disposed substantially cylindrical housing, a lift pipe disposed concentrically of said substantially cylindrical housing and extending into the latter, said lift pipe being adapted to receive an upwardly moving gas stream and entrained granular particles, the upper end of said lift pipe being of gradually increasing diameter, an inverted frusto-conical partition plate disposed within said substantially cylindrical housing, the lower end of said inverted frusto-conical partition plate being disposed below the upper end of said lift pipe, the upper surface of said inverted frusto-conical partition plate being provided with a series of dams to thereby provide a temporary repository for downwardly falling granular particles, and at least one down pipe communicating with the lower end of said inverted frusto-conical partition plate, the upper portion of said substantially cylindrical housing having a gas outlet positioned above said partition plate.

3. Apparatus for disengaging solid particles from lift gas in a gas lift conveyor system comprising a disengager vessel concentrically surrounding the upper portion of the gas lift conduit, into which vessel the conduit extends to a level intermediate the bottom and top of said vessel, an inverted frusto-conical solids-retaining partition plate in said vessel the upper end of which plate intersects the bounding lateral wall of the vessel and the lower end of said plate terminating at a level below and being spaced from the periphery of said lift conduit providing an annular opening for passage of solid particles therethrough to form a layer thereof below said partition plate and resting on the bottom of said disengager vessel, stationary transporting means in addition to said annular opening for conveying solids from said partition plate, a solids discharge pipe communicating with the bottom of said vessel through an inlet nipple of smaller diameter than said pipe and extending for a short distance into said pipe thereby providing an annular area within said pipe surrounding said nipple, said stationary transporting means communicating with said annular area and discharging solid particles thereinto.

4. Apparatus as defined in claim 3 including a gas vent line associated with said solids discharge pipe and communicating therewith at a level above the outlet of said nipple.

5. Apparatus as defined in claim 3 wherein said nipple is of a transverse area less than that of said stationary transporting means, whereby the rate of flow of solid particles through said nipple into said solids-discharge pipe is less than that of the particles flowing into said pipe by way of said annular area.

6. In a system for pneumatic elevation of granular solids by gaseous fluid, comprising an upright lift conduit discharging upwardly into an enlarged gas-solids disengaging vessel; said vessel having a portion thereof extending above the upper end of said lift conduit and the bottom of said vessel being below the upper end of said lift conduit; the improvement comprising: means in said vessel above the upper end of said lift conduit for intercepting the downward free fall of solid particles discharged from said lift conduit, said means comprising at least one annular trough having a closed bottom and arranged to maintain a layer of solid particles collected therein; an open ended annular partition surrounding the lift conduit approximate the upper end thereof and spaced therefrom to provide an annular opening between said partition and said conduit permitting free fall of solid particles through said opening onto the bottom of said disengaging vessel; a solids discharge conduit arranged below the bottom of said disengaging vessel, means for conveying solid particles removed from said trough and discharging such particles directly into said solids discharge conduit, a short pipe passing through the bottom of said disengaging vessel and extending downwardly into said solids discharge conduit, said pipe serving to convey solid particles from a layer maintained on the bottom of said vessel into said discharge conduit, the flow capacity of said short pipe being less than that of said means for conveying the solid particles from said trough.

7. The improvement as defined in claim 6 wherein said short pipe is arranged substantially centrally within said discharge conduit and said means for conveying the solid particles from said trough is arranged to discharge into an annular zone surrounding said short pipe within said discharge conduit.

8. The improvement as defined in claim 7 wherein said solids discharge conduit is provided with a gas vent at a level above the lower end of said short pipe for withdrawing seal gas passed through said discharge conduit.

REYNER KOLLGAARD.

References Cited in the file of this patent

UNITED STATES PATENTS

| Number | Name | Date |
|---|---|---|
| 1,498,630 | Jensen | June 24, 1924 |
| 2,435,927 | Manning | Feb. 10, 1948 |
| 2,449,601 | Gohr | Sept. 21, 1948 |
| 2,565,663 | Osterbur | Aug. 28, 1951 |